US011699266B2

(12) United States Patent
Laurent et al.

(10) Patent No.: US 11,699,266 B2
(45) Date of Patent: Jul. 11, 2023

(54) METHOD, APPARATUS AND SYSTEM FOR FACILITATING NAVIGATION IN AN EXTENDED SCENE

(71) Applicant: INTERDIGITAL CE PATENT HOLDINGS, SAS, Paris (FR)

(72) Inventors: Anthony Laurent, Vignoc (FR); Vincent Alleaume, Pace (FR); Maximilien Bellot, Le Relecq-Kerhuon (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 15/757,090

(22) PCT Filed: Aug. 26, 2016

(86) PCT No.: PCT/EP2016/070181
§ 371 (c)(1),
(2) Date: Mar. 2, 2018

(87) PCT Pub. No.: WO2017/036953
PCT Pub. Date: Mar. 9, 2017

(65) Prior Publication Data
US 2018/0182168 A1   Jun. 28, 2018

(30) Foreign Application Priority Data

Sep. 2, 2015   (EP) ..................................... 15306349

(51) Int. Cl.
*G06T 19/00* (2011.01)
*G11B 27/34* (2006.01)
(Continued)

(52) U.S. Cl.
CPC ............ *G06T 19/003* (2013.01); *G06F 3/016* (2013.01); *G06T 15/10* (2013.01); *G06T 19/20* (2013.01);
(Continued)

(58) Field of Classification Search
CPC ....... G06T 19/003; G06T 15/10; G06T 19/20; G06T 19/00; G06F 3/016; G11B 27/322;
(Continued)

(56) References Cited

U.S. PATENT DOCUMENTS 5,644,694 A * 7/1997 Appleton ................ G06T 15/10
345/474
5,714,997 A * 2/1998 Anderson ............ G02B 27/017
348/39
(Continued)

FOREIGN PATENT DOCUMENTS

CN   102244807 A   11/2011
CN   102369497 A   3/2012
(Continued)

OTHER PUBLICATIONS

Anonymous, "Digital Video Broadcasting (DVB); Specification for the use of Video and Audio Coding in Broadcasting Applications based on the MPEG-2 Transport Stream", European Telecommunications Standards Institute, ETSI Technical Specification ETSI TS 101 154 v2.2.1, Jun. 2015, pp. 1-242.
(Continued)

*Primary Examiner* — Charles L Beard

(57) ABSTRACT

A method, apparatus and system for facilitating navigation toward a region of interest in an extended scene of video content include determining a timeline including information regarding at least one region of interest in the video content and displaying, in a portion of the video content currently being displayed, a visual indicator indicating a
(Continued)

direction in which to move in the video content to cause the display of the at least one region of interest. In one embodiment of the present principles a timeline is attached to the content and carries information evolving over time about the region(s) of interest. A renderer processes the timeline and provides navigation information to a user using available means such as a graphical representation or haptic information, or a combination of several means.

20 Claims, 9 Drawing Sheets

(51) Int. Cl.
| | |
|---|---|
| *G11B 27/32* | (2006.01) |
| *H04N 21/442* | (2011.01) |
| *H04N 21/4728* | (2011.01) |
| *G06F 3/01* | (2006.01) |
| *G06T 15/10* | (2011.01) |
| *G06T 19/20* | (2011.01) |

(52) U.S. Cl.
CPC ............ *G11B 27/322* (2013.01); *G11B 27/34* (2013.01); *H04N 21/44204* (2013.01); *H04N 21/44222* (2013.01); *H04N 21/4728* (2013.01)

(58) Field of Classification Search
CPC ............ G11B 27/34; H04N 21/44204; H04N 21/44222; H04N 21/4728; H04N 21/4728
See application file for complete search history.

(56) References Cited

U.S. PATENT DOCUMENTS

| | | | | |
|---|---|---|---|---|
| 5,977,978 | A * | 11/1999 | Carey | G06T 19/00 |
| | | | | 345/419 |
| 6,040,841 | A * | 3/2000 | Cohen | G06T 15/00 |
| | | | | 345/473 |
| 6,324,336 | B1 * | 11/2001 | Kanda | G11B 27/34 |
| | | | | 386/230 |
| 6,366,296 | B1 * | 4/2002 | Boreczky | G06F 3/0481 |
| | | | | 715/719 |
| 6,392,651 | B1 * | 5/2002 | Stradley | G06F 3/0481 |
| | | | | 345/473 |
| 6,563,529 | B1 * | 5/2003 | Jongerius | G06F 3/04815 |
| | | | | 345/629 |
| 6,585,521 | B1 * | 7/2003 | Obrador | G09B 23/28 |
| | | | | 725/12 |
| 6,636,210 | B1 * | 10/2003 | Cheng | G06T 19/003 |
| | | | | 345/419 |
| 6,636,238 | B1 * | 10/2003 | Amir | G06F 16/60 |
| | | | | 707/E17.101 |
| 6,762,757 | B1 * | 7/2004 | Sander | G06T 17/20 |
| | | | | 345/420 |
| 6,768,486 | B1 * | 7/2004 | Szabo | G06T 17/20 |
| | | | | 345/420 |
| 7,411,594 | B2 * | 8/2008 | Endo | G06T 15/20 |
| | | | | 345/652 |
| 7,672,864 | B2 * | 3/2010 | Nair | G06Q 30/0241 |
| | | | | 705/7.32 |
| 8,224,154 | B2 * | 7/2012 | Shinkai | G11B 27/105 |
| | | | | 386/248 |
| 8,438,595 | B1 * | 5/2013 | Kannan | G11B 27/322 |
| | | | | 725/32 |
| 8,745,499 | B2 * | 6/2014 | Pendergast | H04N 21/47205 |
| | | | | 715/713 |
| 8,769,421 | B2 * | 7/2014 | Meaney | G11B 27/031 |
| | | | | 715/756 |
| 9,082,018 | B1 * | 7/2015 | Laska | G08B 13/19606 |
| 9,110,988 | B1 * | 8/2015 | Tan | G06F 16/70 |
| 9,269,239 | B1 * | 2/2016 | Jensen | G06K 9/00671 |
| 9,305,400 | B2 * | 4/2016 | Kochi | G06T 19/006 |
| 9,313,556 | B1 * | 4/2016 | Borel | H04N 21/84 |
| 9,380,274 | B1 * | 6/2016 | McLean | G06V 20/41 |
| 9,392,212 | B1 * | 7/2016 | Ross | G06T 19/006 |
| 9,396,401 | B2 * | 7/2016 | Maruoka | G08G 1/0962 |
| 9,563,201 | B1 * | 2/2017 | Tofte | G05D 1/0038 |
| 9,672,865 | B2 * | 6/2017 | Fundament | H04N 21/84 |
| 9,699,465 | B2 * | 7/2017 | Ouedraogo | H04N 19/17 |
| 9,703,369 | B1 * | 7/2017 | Mullen | A63F 13/843 |
| 9,721,611 | B2 * | 8/2017 | Matias | G06K 9/00751 |
| 9,767,610 | B2 * | 9/2017 | Takeuchi | G01C 21/365 |
| 9,781,342 | B1 * | 10/2017 | Turley | H04N 23/698 |
| 9,794,541 | B2 * | 10/2017 | Gay | G06T 19/006 |
| 9,836,652 | B2 * | 12/2017 | Lection | G02B 27/0172 |
| 9,836,885 | B1 * | 12/2017 | Eraker | G06T 19/003 |
| 9,851,936 | B2 * | 12/2017 | Nakagawa | G06F 3/16 |
| 9,871,994 | B1 * | 1/2018 | Vaden | H04N 5/77 |
| 9,886,794 | B2 * | 2/2018 | van Os | G01C 21/00 |
| 9,898,868 | B2 * | 2/2018 | Aonuma | G06T 19/006 |
| 9,996,149 | B1 * | 6/2018 | Martin | G02B 27/017 |
| 10,009,596 | B2 * | 6/2018 | Jayaram | H04N 21/4223 |
| 10,049,493 | B1 * | 8/2018 | Verizzo | G06F 3/011 |
| 10,055,887 | B1 * | 8/2018 | Gil | G06F 1/163 |
| 10,062,414 | B1 * | 8/2018 | Westphal | H04N 21/23406 |
| 10,078,644 | B1 * | 9/2018 | Newman | G06F 16/78 |
| 10,078,917 | B1 * | 9/2018 | Gaeta | G06F 3/04815 |
| 10,115,149 | B1 * | 10/2018 | Deem | G06T 19/006 |
| 10,139,985 | B2 * | 11/2018 | Mildrew | G06F 3/011 |
| 10,151,599 | B1 * | 12/2018 | Meador | G01C 21/367 |
| 10,152,815 | B2 * | 12/2018 | Tinsman | G06T 11/60 |
| 10,169,678 | B1 * | 1/2019 | Sachdeva | G06F 3/04842 |
| 10,176,640 | B2 * | 1/2019 | Tierney | G06T 19/006 |
| 10,186,298 | B1 * | 1/2019 | Matias | G06K 9/00758 |
| 10,228,760 | B1 * | 3/2019 | Ross | A63F 13/25 |
| 10,235,788 | B2 * | 3/2019 | Tinsman | G06T 19/006 |
| 10,261,966 | B2 * | 4/2019 | Liu | G06F 16/739 |
| 10,303,421 | B2 * | 5/2019 | Nakagawa | G06F 3/012 |
| 10,303,435 | B2 * | 5/2019 | Sendai | G02B 27/0093 |
| 10,373,342 | B1 * | 8/2019 | Perez, III | G06F 3/011 |
| 10,388,176 | B2 * | 8/2019 | Wallace | G09B 5/06 |
| 10,397,666 | B2 * | 8/2019 | Thomas | H04N 21/8586 |
| 10,419,716 | B1 * | 9/2019 | Tanumihardja | A63F 13/5252 |
| 10,447,394 | B2 * | 10/2019 | Kasilya Sudarsan | H04W 4/38 |
| 10,491,817 | B2 * | 11/2019 | You | G06F 3/013 |
| 10,602,300 | B1 * | 3/2020 | Lyren | G06F 3/011 |
| 10,602,302 | B1 * | 3/2020 | Lyren | G06F 3/011 |
| 10,659,679 | B1 * | 5/2020 | Beeler | H04N 23/69 |
| 10,701,450 | B2 * | 6/2020 | Selvaraj | H04N 21/8549 |
| 10,708,631 | B2 * | 7/2020 | Taibi | H04N 19/513 |
| 10,715,843 | B2 * | 7/2020 | Van Brandenburg | H04N 21/85406 |
| 10,748,577 | B2 * | 8/2020 | Matias | G06K 9/00718 |
| 10,911,658 | B2 * | 2/2021 | Kim | H04N 23/90 |
| 10,962,780 | B2 * | 3/2021 | Ambrus | G06T 15/005 |
| 10,974,147 | B1 * | 4/2021 | Sarria, Jr. | A63F 13/5252 |
| 11,006,089 | B2 * | 5/2021 | Arai | G06T 15/205 |
| 11,079,753 | B1 * | 8/2021 | Roy | G05D 1/0278 |
| 11,113,885 | B1 * | 9/2021 | Cordes | A63F 13/60 |
| 11,180,159 | B1 * | 11/2021 | Post | B60W 50/14 |
| 11,190,753 | B1 * | 11/2021 | Meier | G06T 19/006 |
| 11,205,404 | B2 * | 12/2021 | Kim | G09G 3/003 |
| 11,216,857 | B2 * | 1/2022 | Lokesh | G06F 16/951 |
| 11,303,881 | B2 * | 4/2022 | Zhou | H04N 13/361 |
| 11,496,788 | B2 * | 11/2022 | Takase | A63F 13/49 |
| 11,587,292 | B2 * | 2/2023 | Crocker | G06T 19/006 |
| 2001/0034607 | A1 | 10/2001 | Perschbacher, III | G06Q 40/04 |
| | | | | 706/27 |
| 2002/0012526 | A1 * | 1/2002 | Sai | H04N 21/4325 |
| | | | | 348/E5.103 |
| 2002/0069218 | A1 * | 6/2002 | Sull | G11B 27/105 |
| | | | | 715/201 |
| 2003/0054882 | A1 * | 3/2003 | Suzuki | G06V 10/40 |
| | | | | 463/30 |
| 2003/0086686 | A1 * | 5/2003 | Matsui | G11B 27/034 |
| | | | | 386/281 |
| 2004/0090424 | A1 * | 5/2004 | Hurley | G09G 5/00 |
| | | | | 345/169 |
| 2004/0125133 | A1 * | 7/2004 | Pea | G06F 16/40 |
| | | | | 715/751 |

(56) References Cited

U.S. PATENT DOCUMENTS

| | | | |
|---|---|---|---|
| 2004/0125148 A1* | 7/2004 | Pea | H04N 5/23238 715/802 |
| 2004/0183826 A1* | 9/2004 | Taylor | G06Q 30/06 715/738 |
| 2005/0002648 A1* | 1/2005 | Hoshino | H04N 5/222 386/224 |
| 2005/0010409 A1* | 1/2005 | Hull | G06K 15/00 704/243 |
| 2005/0116964 A1* | 6/2005 | Kotake | G06T 15/205 345/632 |
| 2006/0015925 A1* | 1/2006 | Logan | G06Q 30/02 725/135 |
| 2006/0036513 A1* | 2/2006 | Whatley | G06Q 30/06 705/26.1 |
| 2006/0106625 A1* | 5/2006 | Brown | G06Q 10/109 705/26.1 |
| 2006/0120610 A1* | 6/2006 | Kong | H04N 21/234345 375/E7.172 |
| 2006/0132482 A1* | 6/2006 | Oh | G06T 13/80 345/419 |
| 2006/0178902 A1* | 8/2006 | Vicars | G06F 21/64 705/51 |
| 2007/0052724 A1* | 3/2007 | Graham | G06T 19/003 345/620 |
| 2007/0085141 A1* | 4/2007 | Ando | H04L 67/10 |
| 2007/0103461 A1* | 5/2007 | Suzuno | G06T 17/05 345/419 |
| 2007/0219645 A1* | 9/2007 | Thomas | G05B 15/02 700/29 |
| 2008/0088627 A1* | 4/2008 | Shimizu | G06F 16/71 345/427 |
| 2008/0126206 A1* | 5/2008 | Jarrell | G06Q 30/02 705/14.23 |
| 2008/0168350 A1* | 7/2008 | Jones | G11B 27/11 715/704 |
| 2008/0252640 A1* | 10/2008 | Williams | G06T 19/003 345/420 |
| 2008/0291217 A1* | 11/2008 | Vincent | G06T 17/05 345/629 |
| 2008/0294663 A1* | 11/2008 | Heinley | G11B 27/34 715/764 |
| 2009/0009522 A1* | 1/2009 | Endo | G06T 15/20 345/474 |
| 2009/0024619 A1* | 1/2009 | Dallmeier | G06F 16/7837 |
| 2009/0031246 A1* | 1/2009 | Cowtan | G06Q 30/00 715/786 |
| 2009/0079731 A1* | 3/2009 | Fitzmaurice | G06F 3/04815 345/419 |
| 2009/0100366 A1* | 4/2009 | Fitzmaurice | G06F 3/04815 715/767 |
| 2009/0102711 A1* | 4/2009 | Elwell, Jr. | G01S 5/0252 342/357.52 |
| 2009/0106671 A1* | 4/2009 | Olson | G06F 3/011 715/757 |
| 2009/0160856 A1* | 6/2009 | Hoguet | G06Q 10/06 345/420 |
| 2009/0195652 A1* | 8/2009 | Gal | F41G 3/165 348/148 |
| 2009/0237411 A1* | 9/2009 | Gossweiler, III | G06T 19/00 345/473 |
| 2009/0256904 A1* | 10/2009 | Krill | H04N 13/344 348/47 |
| 2009/0309975 A1* | 12/2009 | Gordon | H04N 21/21 348/E7.085 |
| 2009/0319178 A1* | 12/2009 | Khosravy | H04W 4/02 701/408 |
| 2010/0005424 A1* | 1/2010 | Sundaresan | G06F 16/5854 715/849 |
| 2010/0045666 A1* | 2/2010 | Kornmann | G06F 1/1626 345/419 |
| 2010/0064596 A1* | 3/2010 | Bowsher | G06T 15/00 52/29 |
| 2010/0092156 A1* | 4/2010 | McCrossan | H04N 5/85 386/338 |
| 2010/0115459 A1* | 5/2010 | Kinnunen | G01C 21/3682 715/785 |
| 2010/0122208 A1* | 5/2010 | Herr | G06F 3/04845 715/810 |
| 2010/0123737 A1* | 5/2010 | Williamson | G06F 13/80 345/672 |
| 2010/0134264 A1* | 6/2010 | Nagamine | B60Q 9/005 340/435 |
| 2010/0158099 A1* | 6/2010 | Kalva | H04N 21/8543 375/240.01 |
| 2010/0188503 A1* | 7/2010 | Tsai | G01C 21/20 348/142 |
| 2010/0223004 A1* | 9/2010 | Kondo | G01C 21/36 701/533 |
| 2010/0232504 A1* | 9/2010 | Feng | H04N 19/17 375/E7.243 |
| 2010/0241525 A1* | 9/2010 | Aguera y Arcas | G06Q 30/0601 705/26.1 |
| 2010/0245584 A1* | 9/2010 | Minasyan | H04N 7/183 348/159 |
| 2011/0018895 A1* | 1/2011 | Buzyn | G06T 11/001 345/594 |
| 2011/0052144 A1* | 3/2011 | Abbas | G11B 27/036 386/349 |
| 2011/0141141 A1* | 6/2011 | Kankainen | G01C 21/3647 348/E7.001 |
| 2011/0210962 A1* | 9/2011 | Horan | G06T 19/003 715/757 |
| 2011/0299832 A1* | 12/2011 | Butcher | H04N 21/41407 386/248 |
| 2011/0300522 A1* | 12/2011 | Faubert | H04N 13/363 434/236 |
| 2012/0016578 A1* | 1/2012 | Coppens | G01C 21/32 701/433 |
| 2012/0105474 A1* | 5/2012 | Cudalbu | G01C 21/3664 701/300 |
| 2012/0127284 A1* | 5/2012 | Bar-Zeev | G02B 27/017 348/53 |
| 2012/0176525 A1* | 7/2012 | Garin | H04W 4/029 348/333.02 |
| 2012/0182377 A1* | 7/2012 | Wang | H04N 7/142 348/14.1 |
| 2012/0194547 A1* | 8/2012 | Johnson | G06T 11/00 345/632 |
| 2012/0233000 A1* | 9/2012 | Fisher | G06T 7/70 705/14.71 |
| 2012/0264510 A1* | 10/2012 | Wigdor | A63F 13/40 463/31 |
| 2012/0272173 A1* | 10/2012 | Grossman | G11B 27/034 715/772 |
| 2012/0281500 A1* | 11/2012 | Hoekstra | G01V 1/345 367/68 |
| 2012/0323891 A1* | 12/2012 | Jacobson | G06F 16/43 707/E17.014 |
| 2013/0063558 A1* | 3/2013 | Phipps | G06T 7/70 348/43 |
| 2013/0086109 A1* | 4/2013 | Huang | G06F 16/244 707/770 |
| 2013/0086517 A1* | 4/2013 | Van Lancker | G06F 3/04815 715/800 |
| 2013/0120387 A1* | 5/2013 | Mueller | G06T 15/04 345/426 |
| 2013/0124997 A1* | 5/2013 | Speir | H04N 21/231 715/721 |
| 2013/0129308 A1* | 5/2013 | Karn | H04N 5/783 386/230 |
| 2013/0142384 A1* | 6/2013 | Ofek | H04W 4/023 382/103 |
| 2013/0162632 A1* | 6/2013 | Varga | G06T 19/20 345/419 |
| 2013/0169685 A1* | 7/2013 | Lynch | G01C 21/3635 345/634 |

(56) References Cited

U.S. PATENT DOCUMENTS

| | | | |
|---|---|---|---|
| 2013/0170813 A1* | 7/2013 | Woods | H04N 21/478 386/E5.002 |
| 2013/0179841 A1* | 7/2013 | Mutton | G06F 3/04815 715/850 |
| 2013/0202265 A1* | 8/2013 | Arrasvuori | H04N 5/77 386/224 |
| 2013/0222364 A1* | 8/2013 | Kraus | G06Q 30/02 345/419 |
| 2013/0235270 A1* | 9/2013 | Sasaki | H04N 7/063 348/564 |
| 2013/0290876 A1* | 10/2013 | Anderson | G06T 19/006 715/761 |
| 2013/0297706 A1* | 11/2013 | Arme | H04N 21/8455 709/206 |
| 2013/0311575 A1* | 11/2013 | Woods | H04N 21/8456 709/206 |
| 2013/0321400 A1* | 12/2013 | van Os | G06T 15/005 345/419 |
| 2013/0322844 A1* | 12/2013 | Suzuki | H04N 9/87 386/230 |
| 2013/0326407 A1* | 12/2013 | van Os | G01C 21/00 715/810 |
| 2013/0326425 A1* | 12/2013 | Forstall | G01C 21/3638 715/851 |
| 2013/0330055 A1* | 12/2013 | Zimmermann | H04N 21/2743 386/240 |
| 2014/0040833 A1* | 2/2014 | McLean | G06F 3/0488 715/856 |
| 2014/0046550 A1* | 2/2014 | Palmer | G11B 27/105 701/48 |
| 2014/0047371 A1* | 2/2014 | Palmer | G06F 3/0484 715/771 |
| 2014/0074855 A1* | 3/2014 | Zhao | H04N 21/8456 707/746 |
| 2014/0079126 A1* | 3/2014 | Ye | H04N 19/162 375/240.16 |
| 2014/0089990 A1* | 3/2014 | van Deventer | H04N 21/4728 725/115 |
| 2014/0095122 A1* | 4/2014 | Appleman | G06T 19/003 703/1 |
| 2014/0113660 A1* | 4/2014 | Park | H04W 4/025 455/456.3 |
| 2014/0192087 A1* | 7/2014 | Frost | G06F 3/0325 345/633 |
| 2014/0199050 A1 | 7/2014 | Khalsa et al. | |
| 2014/0207307 A1* | 7/2014 | Jonsson | B60W 50/14 701/1 |
| 2014/0208239 A1* | 7/2014 | Barker | G06F 15/17306 715/757 |
| 2014/0215317 A1* | 7/2014 | Floyd | G06F 17/211 715/243 |
| 2014/0215318 A1* | 7/2014 | Floyd | G06F 17/27 715/243 |
| 2014/0240313 A1* | 8/2014 | Varga | G06F 3/013 345/419 |
| 2014/0274387 A1* | 9/2014 | Lewis | H04N 21/8549 463/31 |
| 2014/0300636 A1* | 10/2014 | Miyazaya | H04R 5/033 345/633 |
| 2014/0313203 A1* | 10/2014 | Shugart | G06T 19/00 345/427 |
| 2014/0327792 A1* | 11/2014 | Mulloni | G06T 7/73 348/211.8 |
| 2014/0341549 A1* | 11/2014 | Hattori | H04N 19/70 386/354 |
| 2014/0354683 A1* | 12/2014 | Suzuki | G06F 16/00 345/632 |
| 2014/0355823 A1* | 12/2014 | Kwon | G06F 16/783 382/103 |
| 2014/0359653 A1* | 12/2014 | Thorpe | H04N 21/441 725/30 |
| 2014/0375683 A1* | 12/2014 | Salter | G06F 3/013 345/633 |
| 2014/0378222 A1* | 12/2014 | Balakrishnan | A63F 13/70 463/31 |
| 2015/0046537 A1* | 2/2015 | Rakib | G06F 16/783 709/204 |
| 2015/0067556 A1* | 3/2015 | Tibrewal | G06F 16/285 715/765 |
| 2015/0070388 A1* | 3/2015 | Sheaffer | G02B 27/01 345/633 |
| 2015/0081706 A1 | 3/2015 | Elmqvist Wulcan et al. | |
| 2015/0093029 A1* | 4/2015 | Tijssen | G06T 11/00 382/173 |
| 2015/0105934 A1* | 4/2015 | Palmer | G07C 5/0841 701/1 |
| 2015/0139608 A1* | 5/2015 | Theobalt | G11B 27/105 386/241 |
| 2015/0172627 A1* | 6/2015 | Lee | H04N 13/106 348/44 |
| 2015/0212719 A1* | 7/2015 | Gottschlag | G08B 13/19673 715/720 |
| 2015/0235672 A1* | 8/2015 | Cudak | H04N 21/8153 386/241 |
| 2015/0237166 A1* | 8/2015 | Denoual | H04L 65/602 709/217 |
| 2015/0244969 A1* | 8/2015 | Fisher | H04N 9/8205 386/224 |
| 2015/0262616 A1* | 9/2015 | Jaime | H04L 65/4076 386/228 |
| 2015/0264296 A1* | 9/2015 | Devaux | H04N 9/8205 386/226 |
| 2015/0271570 A1* | 9/2015 | Pomeroy | H04N 21/84 725/14 |
| 2015/0271571 A1* | 9/2015 | Laksono | H04N 21/44213 725/14 |
| 2015/0279120 A1* | 10/2015 | Sakuragi | G06T 11/005 382/103 |
| 2015/0286875 A1* | 10/2015 | Land | G11B 27/10 382/103 |
| 2015/0317832 A1* | 11/2015 | Ebstyne | G06F 3/012 345/633 |
| 2015/0324940 A1* | 11/2015 | Samson | G06Q 10/06313 705/7.23 |
| 2015/0325268 A1* | 11/2015 | Berger | H04N 21/44209 386/248 |
| 2015/0346955 A1* | 12/2015 | Fundament | H04N 21/4821 715/765 |
| 2015/0348326 A1* | 12/2015 | Sanders | H04N 5/275 345/633 |
| 2015/0350628 A1* | 12/2015 | Sanders | G06F 3/011 345/419 |
| 2015/0362520 A1* | 12/2015 | Wells | G01C 19/00 702/141 |
| 2015/0363966 A1* | 12/2015 | Wells | G06F 3/017 345/419 |
| 2015/0373281 A1* | 12/2015 | White | G06F 16/7867 348/660 |
| 2016/0005229 A1* | 1/2016 | Lee | G06F 3/0488 345/419 |
| 2016/0026874 A1* | 1/2016 | Hodulik | H04N 5/232 386/281 |
| 2016/0050349 A1* | 2/2016 | Vance | G06T 3/0043 348/36 |
| 2016/0054889 A1* | 2/2016 | Hadley | G06F 17/50 715/849 |
| 2016/0063103 A1* | 3/2016 | Bostick | G06F 16/787 707/706 |
| 2016/0093105 A1* | 3/2016 | Rimon | G06T 19/006 345/633 |
| 2016/0148417 A1* | 5/2016 | Kim | G05D 1/0274 345/419 |
| 2016/0155260 A1* | 6/2016 | Jenkins | G06T 15/20 345/419 |
| 2016/0163107 A1* | 6/2016 | Chen | G06T 19/006 345/419 |

(56) References Cited

U.S. PATENT DOCUMENTS

| | | | |
|---|---|---|---|
| 2016/0165309 A1* | 6/2016 | Van Brandenburg | H04N 21/64322 725/116 |
| 2016/0225179 A1* | 8/2016 | Sheppard | G06T 11/60 |
| 2016/0227262 A1* | 8/2016 | Grant | H04N 21/8545 |
| 2016/0239252 A1* | 8/2016 | Nakagawa | G02B 27/0172 |
| 2016/0259854 A1* | 9/2016 | Liu | G06F 16/739 |
| 2016/0267720 A1* | 9/2016 | Mandella | G06T 19/006 |
| 2016/0292511 A1* | 10/2016 | Ayalasomayajula | G06K 9/00751 |
| 2016/0343107 A1* | 11/2016 | Newman | G06T 3/0018 |
| 2016/0343351 A1* | 11/2016 | Chen | G09G 5/14 |
| 2016/0350969 A1* | 12/2016 | Castillo | H04N 13/221 |
| 2016/0350972 A1* | 12/2016 | Kauffmann | G06T 19/006 |
| 2016/0360266 A1* | 12/2016 | Wilms | H04N 21/251 |
| 2016/0371882 A1* | 12/2016 | Ege | G06K 9/00214 |
| 2016/0373828 A1* | 12/2016 | Seol | H04N 21/8153 |
| 2016/0379682 A1* | 12/2016 | Williams | H04N 21/4728 386/278 |
| 2016/0381290 A1* | 12/2016 | Prayle | G06V 40/20 348/207.11 |
| 2016/0381306 A1* | 12/2016 | Yang | G11B 27/031 386/280 |
| 2017/0025152 A1* | 1/2017 | Jaime | H04N 21/2396 |
| 2017/0026577 A1* | 1/2017 | You | H04N 5/9201 |
| 2017/0053545 A1* | 2/2017 | Yang | G06T 19/003 |
| 2017/0061038 A1* | 3/2017 | Ruiz | G06F 17/5004 |
| 2017/0076408 A1* | 3/2017 | D'Souza | G06Q 40/00 |
| 2017/0076571 A1* | 3/2017 | Borel | G08B 13/19673 |
| 2017/0078767 A1* | 3/2017 | Borel | G06K 9/00758 |
| 2017/0090196 A1* | 3/2017 | Hendron | G02B 27/0101 |
| 2017/0103571 A1* | 4/2017 | Beaurepaire | G06F 3/011 |
| 2017/0109585 A1* | 4/2017 | Matias | H04N 21/44204 |
| 2017/0110151 A1* | 4/2017 | Matias | G06V 20/48 |
| 2017/0118540 A1* | 4/2017 | Thomas | H04N 21/440263 |
| 2017/0134714 A1* | 5/2017 | Soni | H04N 13/189 |
| 2017/0140796 A1* | 5/2017 | Fontenot | G11B 27/11 |
| 2017/0155912 A1* | 6/2017 | Thomas | H04N 21/8456 |
| 2017/0169125 A1* | 6/2017 | Greco | G06Q 50/01 |
| 2017/0180444 A1* | 6/2017 | Denoual | G11B 27/034 |
| 2017/0180780 A1* | 6/2017 | Jeffries | H04N 21/4307 |
| 2017/0182406 A1* | 6/2017 | Castiglia | G06K 9/00778 |
| 2017/0192637 A1* | 7/2017 | Ren | G01C 21/3667 |
| 2017/0206798 A1* | 7/2017 | Newman | H04N 13/282 |
| 2017/0229147 A1* | 8/2017 | McKaskle | H04N 21/4223 |
| 2017/0244959 A1* | 8/2017 | Ranjeet | G06T 7/292 |
| 2017/0249839 A1* | 8/2017 | Becker | G08G 1/096725 |
| 2017/0255372 A1* | 9/2017 | Hsu | H04N 21/816 |
| 2017/0264864 A1* | 9/2017 | Mcnelley | H04N 7/144 |
| 2017/0280166 A1* | 9/2017 | Walkingshaw | H04N 19/86 |
| 2017/0285737 A1* | 10/2017 | Khalid | G06F 3/04842 |
| 2017/0285738 A1* | 10/2017 | Khalid | G06T 15/20 |
| 2017/0287357 A1* | 10/2017 | Weiss | G06F 17/5009 |
| 2017/0289219 A1* | 10/2017 | Khalid | H04N 21/816 |
| 2017/0311035 A1* | 10/2017 | Lewis | H04N 21/4665 |
| 2017/0315697 A1* | 11/2017 | Jacobson | G06F 16/26 |
| 2017/0316806 A1* | 11/2017 | Warren | G11B 27/031 |
| 2017/0322622 A1* | 11/2017 | Hong | G06F 3/041 |
| 2017/0328733 A1* | 11/2017 | Gotoh | G01C 21/367 |
| 2017/0337776 A1* | 11/2017 | Herring | A63F 13/79 |
| 2017/0352196 A1* | 12/2017 | Chen | G06T 11/00 |
| 2017/0354883 A1* | 12/2017 | Benedetto | G06T 19/20 |
| 2017/0354884 A1* | 12/2017 | Benedetto | A63F 13/537 |
| 2017/0354888 A1* | 12/2017 | Benedetto | A63F 13/47 |
| 2017/0356753 A1* | 12/2017 | Findley | G01C 21/3635 |
| 2018/0001200 A1* | 1/2018 | Tokgoz | A63F 13/52 |
| 2018/0005430 A1* | 1/2018 | Griffith | G06F 3/033 |
| 2018/0018510 A1* | 1/2018 | Williams | G11B 27/10 |
| 2018/0020162 A1* | 1/2018 | Turley | G02B 27/017 |
| 2018/0021684 A1* | 1/2018 | Benedetto | A63F 13/49 463/24 |
| 2018/0025500 A1* | 1/2018 | Nielsen | G06T 7/74 382/103 |
| 2018/0025542 A1* | 1/2018 | Upendran | G06K 9/00214 345/420 |
| 2018/0025649 A1* | 1/2018 | Contreras | G05D 1/0033 701/3 |
| 2018/0041750 A1* | 2/2018 | Kim | G06F 18/24 |
| 2018/0053130 A1* | 2/2018 | Pettersson | G06Q 10/06311 |
| 2018/0061116 A1* | 3/2018 | Mitchell | G06F 3/012 |
| 2018/0070113 A1* | 3/2018 | Phillips | H04N 21/6405 |
| 2018/0070119 A1* | 3/2018 | Phillips | H04L 65/75 |
| 2018/0077440 A1* | 3/2018 | Wadhera | H04N 21/23418 |
| 2018/0077451 A1* | 3/2018 | Yip | H04N 21/44008 |
| 2018/0081520 A1* | 3/2018 | Han | G06F 3/04815 |
| 2018/0089901 A1* | 3/2018 | Rober | G06F 3/016 |
| 2018/0095616 A1* | 4/2018 | Valdivia | H04L 51/16 |
| 2018/0095635 A1* | 4/2018 | Valdivia | G02B 27/0093 |
| 2018/0095636 A1* | 4/2018 | Valdivia | G06F 3/04815 |
| 2018/0096507 A1* | 4/2018 | Valdivia | G06F 1/163 |
| 2018/0098059 A1* | 4/2018 | Valdivia | H04L 51/16 |
| 2018/0101293 A1* | 4/2018 | Fang | G06F 1/1694 |
| 2018/0107211 A1* | 4/2018 | Schubert | G05D 1/0044 |
| 2018/0122422 A1* | 5/2018 | Allison | H04N 21/435 |
| 2018/0130255 A1* | 5/2018 | Hazeghi | H04N 13/243 |
| 2018/0143023 A1* | 5/2018 | Bjorke | G01C 21/206 |
| 2018/0143756 A1* | 5/2018 | Mildrew | G06F 3/011 |
| 2018/0144547 A1* | 5/2018 | Shakib | G06T 19/003 |
| 2018/0150204 A1* | 5/2018 | Macgillivray | G06F 3/04815 |
| 2018/0160123 A1* | 6/2018 | Van Der Auwera | H04N 19/167 |
| 2018/0164588 A1* | 6/2018 | Leppanen | G02B 27/017 |
| 2018/0176661 A1* | 6/2018 | Varndell | G06F 40/197 |
| 2018/0182146 A1* | 6/2018 | Laaksonen | H04N 1/00204 |
| 2018/0189958 A1* | 7/2018 | Budagavi | H04N 21/816 |
| 2018/0190323 A1* | 7/2018 | de Jong | G11B 27/034 |
| 2018/0199080 A1* | 7/2018 | Jackson, Jr. | H04N 21/8549 |
| 2018/0204362 A1* | 7/2018 | Tinsman | G06T 19/20 |
| 2018/0204385 A1* | 7/2018 | Sarangdhar | G08C 17/02 |
| 2018/0210627 A1* | 7/2018 | Woo | G06F 3/013 |
| 2018/0224945 A1* | 8/2018 | Hardie-Bick | G06F 3/04815 |
| 2018/0225870 A1* | 8/2018 | Upendran | G06T 17/05 |
| 2018/0242028 A1* | 8/2018 | Van Brandenburg | H04N 21/8456 |
| 2018/0255332 A1* | 9/2018 | Heusser | H04N 21/242 |
| 2018/0261255 A1* | 9/2018 | Goshen | H04N 21/4394 |
| 2018/0271740 A1* | 9/2018 | Lydecker | G02B 27/017 |
| 2018/0275745 A1* | 9/2018 | Crisler | G06T 13/40 |
| 2018/0278993 A1* | 9/2018 | Crisler | H04N 21/44218 |
| 2018/0284974 A1* | 10/2018 | Meganathan | G06F 3/04817 |
| 2018/0295400 A1* | 10/2018 | Thomas | H04N 21/85406 |
| 2018/0308187 A1* | 10/2018 | Rotem | G06F 3/011 |
| 2018/0308523 A1* | 10/2018 | Silvestri | G11B 27/34 |
| 2018/0310116 A1* | 10/2018 | Arteaga | G06F 3/012 |
| 2018/0314322 A1* | 11/2018 | Tseng | G06F 3/011 |
| 2018/0316853 A1* | 11/2018 | Liang | G03B 19/00 |
| 2018/0318716 A1* | 11/2018 | Benedetto | A63F 13/31 |
| 2018/0321798 A1* | 11/2018 | Kawamura | G06F 3/0481 |
| 2018/0326286 A1* | 11/2018 | Rathi | A43B 5/1641 |
| 2018/0338111 A1* | 11/2018 | Mourkogiannis | G06F 3/048 |
| 2018/0341811 A1* | 11/2018 | Bendale | G02B 27/0172 |
| 2018/0343387 A1* | 11/2018 | Bostick | G06V 20/20 |
| 2018/0349703 A1* | 12/2018 | Rathod | H04W 4/029 |
| 2018/0350125 A1* | 12/2018 | Duong | G06T 13/80 |
| 2018/0350144 A1* | 12/2018 | Rathod | H04W 4/029 |
| 2018/0357820 A1* | 12/2018 | Tytgat | G06F 3/012 |
| 2018/0357825 A1* | 12/2018 | Hofmann | G06T 19/006 |
| 2018/0365496 A1* | 12/2018 | Hovden | G06K 9/00684 |
| 2018/0365855 A1* | 12/2018 | Laurent | G06T 7/74 |
| 2018/0374276 A1* | 12/2018 | Powers | G06T 19/20 |
| 2019/0004618 A1* | 1/2019 | Tadros | G06F 3/0346 |
| 2019/0005719 A1* | 1/2019 | Fleischman | G06F 17/05 |
| 2019/0026944 A1* | 1/2019 | Laaksonen | G06T 15/20 |
| 2019/0033989 A1* | 1/2019 | Wang | G06F 3/0346 |
| 2019/0043259 A1* | 2/2019 | Wang | G06F 3/012 |
| 2019/0045268 A1* | 2/2019 | Veeramani | H04N 21/4383 |
| 2019/0051051 A1* | 2/2019 | Kaufman | G01C 21/32 |
| 2019/0056848 A1* | 2/2019 | DiVerdi | G09G 5/00 |
| 2019/0072405 A1* | 3/2019 | Luchner | G01C 21/3676 |
| 2019/0087067 A1* | 3/2019 | Hovden | G06F 3/04815 |
| 2019/0104316 A1* | 4/2019 | Da Silva Pratas Gabriel | H04N 19/167 |

(56) References Cited

U.S. PATENT DOCUMENTS

| | | |
|---|---|---|
| 2019/0114803 A1* | 4/2019 | Liu .................... H04N 7/18 |
| 2019/0122699 A1* | 4/2019 | Matias ................. G11B 27/34 |
| 2019/0124316 A1* | 4/2019 | Yoshimura .......... H04N 13/361 |
| 2019/0128765 A1* | 5/2019 | Hadj-Rabah ........ G02B 27/0172 |
| 2019/0129602 A1* | 5/2019 | Siwak .................. G06F 3/0488 |
| 2019/0139305 A1* | 5/2019 | Sakamoto ............ G06T 7/75 |
| 2019/0156495 A1* | 5/2019 | Altuev ................. G06K 9/00771 |
| 2019/0172265 A1* | 6/2019 | Cossairt ............... A63F 13/428 |
| 2019/0179145 A1* | 6/2019 | Ibrahim ............... G06F 3/04815 |
| 2019/0200058 A1* | 6/2019 | Hall ..................... H04N 21/4122 |
| 2019/0213211 A1* | 7/2019 | Zhao .................... G06F 3/0485 |
| 2019/0228230 A1* | 7/2019 | Onuma ................ G06V 20/42 |
| 2019/0259424 A1* | 8/2019 | Lintz .................... G11B 27/005 |
| 2019/0273864 A1* | 9/2019 | Bostick ................ G06V 20/20 |
| 2019/0273865 A1* | 9/2019 | Turley .................. G02B 27/017 |
| 2019/0289341 A1* | 9/2019 | Vasco de Oliveira Redol ............ G02B 27/017 |
| 2019/0304188 A1* | 10/2019 | Bridgeman ........... G06T 19/006 |
| 2019/0318540 A1* | 10/2019 | Piemonte ............. G06F 3/0488 |
| 2019/0324718 A1* | 10/2019 | Francisco ............. G06F 3/167 |
| 2019/0356894 A1* | 11/2019 | Oh ........................ G06F 3/011 |
| 2019/0373293 A1* | 12/2019 | Bortman ............... H04N 19/59 |
| 2019/0394500 A1* | 12/2019 | Sugimoto ............. H04N 21/2668 |
| 2020/0035025 A1* | 1/2020 | Crocker ............... G06T 19/006 |
| 2020/0035026 A1* | 1/2020 | Demirchian .......... H04N 21/235 |
| 2020/0045359 A1* | 2/2020 | Tokumo ............... H04N 21/26258 |
| 2020/0053336 A1* | 2/2020 | Kawai .................. H04N 13/111 |
| 2020/0107003 A1* | 4/2020 | Phillips ................ H04N 19/167 |
| 2020/0118342 A1* | 4/2020 | Varshney .............. G06T 13/20 |
| 2020/0189459 A1* | 6/2020 | Bush .................... G06K 9/00845 |
| 2020/0198660 A1* | 6/2020 | Bellet ................... G06V 20/58 |
| 2020/0201512 A1* | 6/2020 | Faulkner .............. H04L 12/1827 |
| 2020/0245093 A1* | 7/2020 | Lyren ................... G06F 3/013 |
| 2020/0252741 A1* | 8/2020 | Lyren ................... H04S 7/303 |
| 2020/0258278 A1* | 8/2020 | Mirhosseini ......... G06T 7/246 |
| 2020/0273235 A1* | 8/2020 | Emami ................. G06T 7/50 |
| 2020/0285784 A1* | 9/2020 | Isbel .................... G06F 30/13 |
| 2020/0286526 A1* | 9/2020 | Osler .................... H04N 21/44213 |
| 2020/0289935 A1* | 9/2020 | Azmandian ........... A63F 13/53 |
| 2020/0342673 A1* | 10/2020 | Lohr ..................... G02B 27/0172 |
| 2020/0349751 A1* | 11/2020 | Bentovim ............. G09B 5/06 |
| 2020/0351525 A1* | 11/2020 | Sugimoto ............. G06T 19/00 |
| 2020/0363940 A1* | 11/2020 | DiVerdi ............... G06F 3/04845 |
| 2020/0372935 A1* | 11/2020 | Matias ................. G06K 9/00751 |
| 2020/0380733 A1* | 12/2020 | Inatani ................. G06F 3/013 |
| 2021/0055787 A1* | 2/2021 | Chhabra ............... G06F 3/012 |
| 2021/0058733 A1* | 2/2021 | Lyren ................... H04R 5/04 |
| 2021/0110610 A1* | 4/2021 | Xu ........................ G06F 3/017 |
| 2021/0150223 A1* | 5/2021 | Onuma ................. G06T 7/70 |
| 2021/0183114 A1* | 6/2021 | Corson ................. A63F 13/213 |
| 2021/0192385 A1* | 6/2021 | Farré Guiu ........... G06V 20/46 |
| 2021/0204087 A1* | 7/2021 | Lyren ................... G06F 3/011 |
| 2021/0252398 A1* | 8/2021 | Benedetto ............. A63F 13/533 |
| 2021/0256597 A1* | 8/2021 | Soppin ................. H04L 63/0853 |
| 2021/0283497 A1* | 9/2021 | Gullicksen ........... G06T 19/20 |
| 2021/0283514 A1* | 9/2021 | Benedetto ............. A63F 13/87 |
| 2021/0372810 A1* | 12/2021 | Hato ..................... G08G 1/096855 |
| 2021/0382305 A1* | 12/2021 | Chang .................. G02B 27/0172 |
| 2022/0058825 A1* | 2/2022 | Chen .................... G06V 20/56 |
| 2022/0058844 A1* | 2/2022 | Chen .................... G06V 20/20 |
| 2022/0148254 A1* | 5/2022 | Sorkine Hornung ........ H04N 13/117 |
| 2022/0161140 A1* | 5/2022 | Benedetto ............. A63F 13/25 |
| 2022/0165306 A1* | 5/2022 | Hamada ............... H04N 21/8456 |
| 2022/0305385 A1* | 9/2022 | Konno ................. A63F 13/56 |
| 2022/0343590 A1* | 10/2022 | Jutan ..................... G06F 3/011 |
| 2023/0007231 A1* | 1/2023 | Kadam ................. G09G 5/00 |

FOREIGN PATENT DOCUMENTS

| | | |
|---|---|---|
| CN | 102611872 A | 7/2012 |
| CN | 104185078 A | 12/2014 |
| CN | 104685893 A | 6/2015 |
| EP | 1376587 | 1/2004 |
| EP | 2669866 A2 | 12/2013 |
| EP | 2868103 B1 | 12/2016 |
| JP | 2002514875 A | 5/2002 |
| JP | 2013538377 A | 10/2013 |
| JP | 2013250830 A | 12/2013 |
| JP | 2014075743 A | 4/2014 |
| JP | 2014215828 A | 11/2014 |
| JP | 2014235469 A | 12/2014 |
| JP | 2015057706 A | 3/2015 |
| KR | 20090040462 A | 4/2009 |
| WO | 9959026 A2 | 11/1999 |
| WO | 2008033853 A2 | 3/2008 |
| WO | WO2014202486 | 12/2014 |

OTHER PUBLICATIONS

Anonymous, "High Efficiency Video Coding", ITU-T H.265, Telecommunication Standardization Sector of ITU, Series H: Audiovisual and Multimedia Systems, Infrastructure of audiovisual services—Coding of moving video, Apr. 2015, pp. 1-634.

Anonymous, "SubRip", Wikipedia, https://en.wikipedia.org/w/index.php?title=SubRip&oldid=667432445, Jun. 18, 2015, pp. 1-6.

Armstrong et al., "TVX2014 Short Paper—Enhancing Subtitles", BBC R&D, http://www.bbc.co.uk/rd/blog/2014/10/tvx2014-short-paper-enhancing-subtitles, Nov. 3, 2014, pp. 1-7.

Kim et al., "Scene Graph for Dynamic Virtual Environment: Spangraph", International Journal of Virtual Reality (IJVR), vol. 4, No. 2, Dec. 2015, pp. 23-36.

CN102369497 A, Translated "Method and apparatus for creating a zone of interest in a video display" Mar. 7, 2012.

JP2013538377, Translated "Content mapping of mobile device-based for the augmented reality environment" Oct. 10, 2013.

JP2014215828, Translated "Image Data Reproduction Device, and Viewpoint Information Generation Device" Nov. 17, 2014.

JP2014075743, Translated "Video Viewing History Analysis Device, Video Viewing History Analysis Method and Video Viewing History Analysis Program" Apr. 24, 2014.

* cited by examiner

```
<ROI: ID1; Global_LOI: 3; startTime: t1; stopTime: t1end>
        <OV: OV11; startTime: t1; stopTime: t1end>
        <LOI: LOI11; startTime: t1; stopTime: t1l2>
        <LOI: LOI12; startTime: t1l2; stopTime: t1end>
</ROI>

<ROI: ID2; Global_LOI: 4; startTime: t2; stopTime: t2end>
        <OV: OV21; startTime: t2; stopTime: t2o2>
        <OV: OV22; startTime: t2o2; stopTime: t2end>
        <LOI: LOI21; startTime: t2; stopTime: t2l2>
        <LOI: LOI22; startTime: t2l2; stopTime: t2end>
</ROI>
```

FIG. 3

```
<ROI: ID1; Global_LOI: 3; startTime: t1; stopTime: t1end>
    <OV: OV11; startTime: t1>
    <LOI: LOI11; startTime: t1>
    <LOI: LOI12; startTime: t1l2 >
</ROI>

<ROI: ID2; Global_LOI: 4; startTime: t2; stopTime: t2end>
    <OV: OV21; startTime: t2>
    <OV: OV22; startTime: t2o2>
    <LOI: LOI21; startTime: t2>
    <LOI: LOI22; startTime: t2l2>
</ROI>
```

FIG. 4

```
<ROI: ID1; Global_LOI: 3; startTime: t1; stopTime: t1end>
    <OV: OV11; startTime: t1; stopTime: t1end>
    <LOI: LOI11; startTime: t1; stopTime: t1l2>
    <LOI: LOI12; startTime: t1l2; stopTime: t1end>
    <COORDS: COORDS11; startTime: t1; stopTime: t1c2>
    <COORDS: COORDS12; startTime: t1c2; stopTime: t1c3>
    <COORDS: COORDS12; startTime: t1c3; stopTime: t1end>
</ROI>

<ROI: ID2; Global_LOI: 4; startTime: t2; stopTime: t2end>
    <OV: OV21; startTime: t2>
    <OV: OV22; startTime: t2o2>
    <LOI: LOI21; startTime: t2; stopTime: t2l2>
    <LOI: LOI22; startTime: t2l2; stopTime: t2end>
    <COORDS: COORDS21; startTime: t2; stopTime: t2c2>
    <COORDS: COORDS22; startTime: t2c2; stopTime: t2end>
</ROI>
```

FIG. 6

METHOD, APPARATUS AND SYSTEM FOR FACILITATING NAVIGATION IN AN EXTENDED SCENE

This application is a national stage application under 35 U.S.C. § 371 of International Application PCT/EP2016/070181, filed Aug. 26, 2016, which was published in accordance with PCT Article 21(2) on Mar. 9, 2017, in English, and which claims the benefit of European patent application No. 15306349.0 filed Sep. 2, 2015.

TECHNICAL FIELD

The present principles relate generally to navigating through video content and, more particularly, to facilitating navigation in an extended scene in video content.

BACKGROUND

Recently there has been a growth of available large field-of-view content (up to 360°). Such content is potentially not fully visible by a user watching the content on common devices such as Head Mounted Displays, Oculus Rift, smart glasses, PC screens, tablets, smartphones and the like. That means that at a given moment, a user may only be viewing a part of the content, and often times, a part of the content not important to the storyline. Although a user can navigate within the content by various means such as head movement, mouse movement, touch screen, voice and the like, if the content represents a dynamic scene (e.g. a movie) with events happening at different moments and at different locations in the content, the user is not sure to be looking at a relevant part of the scene and may miss important events/interesting sequences if they occur outside of his/her current field of view.

SUMMARY OF THE INVENTION

These and other drawbacks and disadvantages of the prior art are addressed by the present principles, which are directed at a method, apparatus and system for facilitating navigation in a wide scene and directing a user's attention to a region of interest.

In one embodiment of the present principles a timeline is attached to the content and carries information evolving over time about the region(s) of interest and more particularly about a location or object ID, the associated optimal viewpoint(s) and level(s) of interest. On the device, a renderer (3D engine, video player . . . ) processes the timeline and provides navigation information to a user using available means (graphical representation, haptic information, or a combination of several means . . . ).

BRIEF DESCRIPTION OF THE DRAWINGS

The teachings of the present invention can be readily understood by considering the following detailed description in conjunction with the accompanying drawings, in which:

FIG. 3 depicts a representative syntax for providing the information in the timing diagram of FIG. 2 in accordance with an embodiment of the present principles;

FIG. 4 depicts a version of the syntax of FIG. 3 reduced in accordance with an embodiment of the present principles;

FIG. 6 depicts a representative syntax for providing the information in the timing diagram of FIG. 5 in accordance with an embodiment of the present principles;

To facilitate understanding, identical reference numerals have been used, where possible, to designate identical elements that are common to the figures. The drawings are not to scale, and one or more features may be expanded or reduced for clarity.

DETAILED DESCRIPTION

Embodiments of the present principles advantageously provide a method, an apparatus and a system facilitating navigation in a wide scene and directing a user's attention to a region of interest. Although the present principles will be described primarily within the context of specific visual indicators and directing a user's view in a horizontal direction, the specific embodiments of the present principles should not be treated as limiting the scope of the invention. It will be appreciated by those skilled in the art and informed by the teachings of the present principles that the concepts of the present principles can be advantageously applied to any visual indicators that can be used to direct a user's attention to any portion of the video content whether it be in the horizontal, vertical and/or diagonal direction.

Embodiments of the present principles are directed to facilitating a user to navigate in a wide rendered scene towards a location for optimal viewpoint (OV1) where the user will be able to watch region(s) of interest (ROI) of a scene that could be of interest for the user. That is, at a given moment, several parts of a scene could be of interest to a user. As such, in accordance with embodiments of the present principles it is important to inform a user that several ROIs are present at the same time. Such ROIs can be of various degrees of interest and as such embodiments of the present principles include associating a rank to each ROI indicating its level of interest (LOI). The LOI of a ROI can also evolve over time. The various LOIs values can be the same for all the users or be personalized, with respect to the type of ROIs for which the user has previously indicated interest. In various embodiments of the present principles, using the LOI, a user can decide to navigate towards the ROI or, at the contrary, can estimate that it is of no interest at the moment.

Figure 1:
FIG. 1 depicts a pictorial representation of a user's view of a portion of a total available content.

FIG. 1 depicts a pictorial representation of a user's view of a portion of a total available content. That is, in FIG. 1, a black rectangular outlined box represents a portion of a total content within a user's field of view. Embodiments of the present principles combine both, the notion of ROI and OV in a virtual scene by, for example, having a timeline indicating at each moment what is the ROI (e.g. the virtual object identifier or shape coordinates) as well as an associated. OV(s). That is, in accordance with embodiments of the present principles, the notion of optimal viewpoint (OV) comprises a location and direction (orientation) in which to direct a user's attention. In various embodiments the OV can coincide with the ROI. In alternate embodiments, the OV can include a trade-off direction allowing a user to watch 2 different ROIs simultaneously. In addition in various embodiments of the present principles, an OV can evolve over time and be associated with changes related to ROI(s). In such embodiments, it is conceivable to provide not all the coordinates but only a subset of coordinates providing a means to move from one coordinate to the other (i.e. the trajectory to follow). For example, a first position, a last position and an intermediate position(s) are provided as well as a trajectory function to apply. In such embodiments, the trajectory can include a straight line between two points, a Bezier curve, and the like. A renderer would then interpolate all the intermediate positions to determine a final position. Such a solution in accordance with the present principles significantly reduces an amount of data to be provided. Such a solution can also be applied to the direction.

In accordance with various embodiments of the present principles, for a video which is a 2D content, the ROI can be, for example, a rectangle and the coordinates can include the upper left and lower right corners of the rectangle. For a 3D scene, the ROI can be assimilated to a bounding box or a more complex shape. In such embodiments, information provided to a renderer can include the coordinates of the shape or alternatively can include an identifier of an object or group of objects/shapes.

In the embodiments of the present principles, a main difference between providing the object/group of objects ID and the coordinates of a 2D or 3D shape is that in the first case the ID and timing information (start time and duration) indicating when and how long a ROI is active only has to be provided once, whereas in the second case, the coordinates and timing information have to be provided to a renderer each time the ROI changes (potentially at each frame). In the first case, the renderer knows at every moment the location of the object with respect to the user's view and/or virtual location in the related scene. In the second case, the solution proposed above for reducing the amount of data can also be applied to model the ROI trajectory.

In various embodiments of the present principles, the content may have some periods without any interesting events and in such cases there is no information about a ROI. In alternate embodiments several ROIs could be present simultaneously. In such embodiments the ROIs could have different levels of interest (LOI). In accordance with embodiments of the present principles, signaling such simultaneous ROIs with an associated LOI can be accomplished using visual, haptic messages or a combination of messages.

That is in various embodiments of the present principles, a LOI includes data related to a ROI and typically indicates information about a level of interest associated with the ROI. The LOI can include discrete information, for example in one embodiment, having a value range of, for example, 5 where 1 indicates a low level of interest in a ROI and 5 indicates a high level of interest or vice versa. It should be noted that in accordance with various embodiments of the present principles, a LOI can evolve over time.

In accordance with the present principles, information regarding the OV, ROI and LOI are predetermined and available to a renderer before a ROI becomes active in content. That is, in accordance with the present principles a renderer is able to begin to signal a user about a ROI to be presented. A goal is to enable the user to anticipate movements required to bring a ROI into the user's field of view with enough time so as not to miss the beginning of a sequence or object of interest in the ROI. In one embodiment of the present principles, during a preparation step, the renderer can use the LOI associated to the start time of the sequence. In alternate embodiments, the renderer can use a global LOI. A global LOI value can include the mean of the values the LOI takes over time or a value set by a content creator. The global LOI provides an overview of the global level of interest of a sequence which can be contrary to a first LOI value of the sequence, which is not necessarily representative of the whole sequence.

Figure 2:
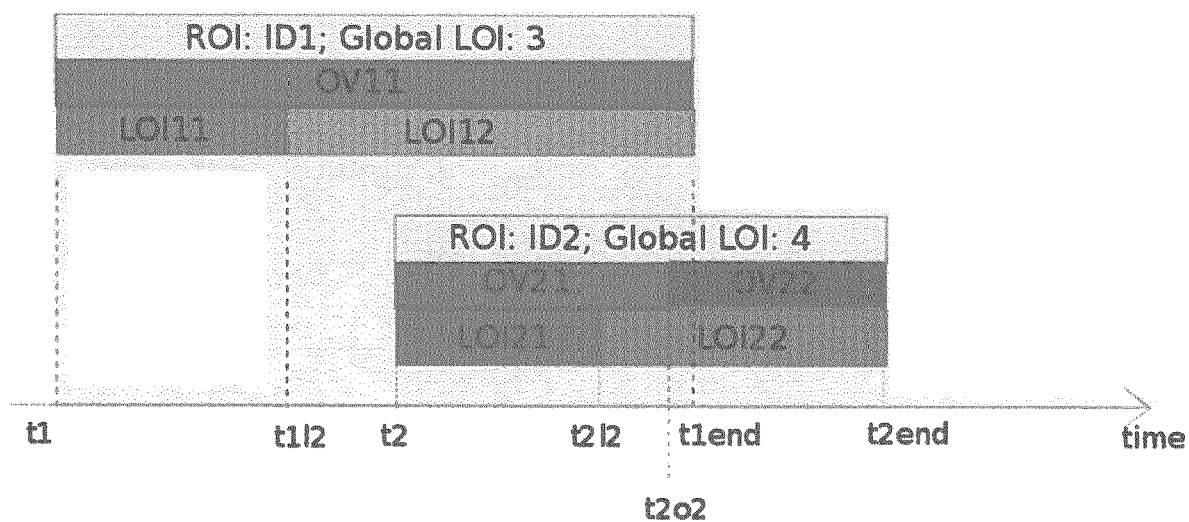
FIG. 2 depicts a timing diagram/timeline of two ROIs identified by an object ID in accordance with an embodiment of the present principles.

FIG. 2 depicts a timing diagram/timeline of two ROIs identified by an object ID in accordance with an embodiment of the present principles. In the example of FIG. 2, the first ROI has a global LOI of 3 associated with it. The first ROI also has associated an OV that is the same all the time and is equal to OV11. In the example of FIG. 2, the first ROI has an associated LOI that evolves over time and takes the values LOI11 and LOI12 at timestamps t1 and t112.

Further, in the embodiment of FIG. 2, the second ROI has a global LOI of 4. The OV of the second ROI of FIG. 2 evolves over time and takes the values OV21 and OV22 and the LOI evolves over time and takes the values LOI21 and LOI22 at timestamps t2 and t212. As recited above, the ROI is an object identified by its ID.

FIG. 3 depicts a representative syntax for providing the information in the timing diagram of FIG. 2 in accordance with an embodiment of the present principles. That is, the syntax of FIG. 3 can be used to provide the information of the example of FIG. 2 to a renderer for use as will be described below.

In accordance with various embodiments of the present principles, the syntax of FIG. 3 can be reduced for efficiency. More specifically, FIG. 4 depicts a version of the syntax of FIG. 3 reduced in accordance with an embodiment of the present principles. That is, in the reduced syntax of FIG. 4, some useless information has been removed. For example, in the reduced syntax of FIG. 4, the stopTime is not set for values (e.g. LOI11 and LOI12) of a same field (e.g. LOI) that come one after another. In the reduced syntax of FIG. 4, the stopTime is equal to the following value's startTime (LOI11's stopTime=LOI12's startTime) or to the parent element's stopTime (LOI12's stopTime=ROI's stopTime).

Figure 5:
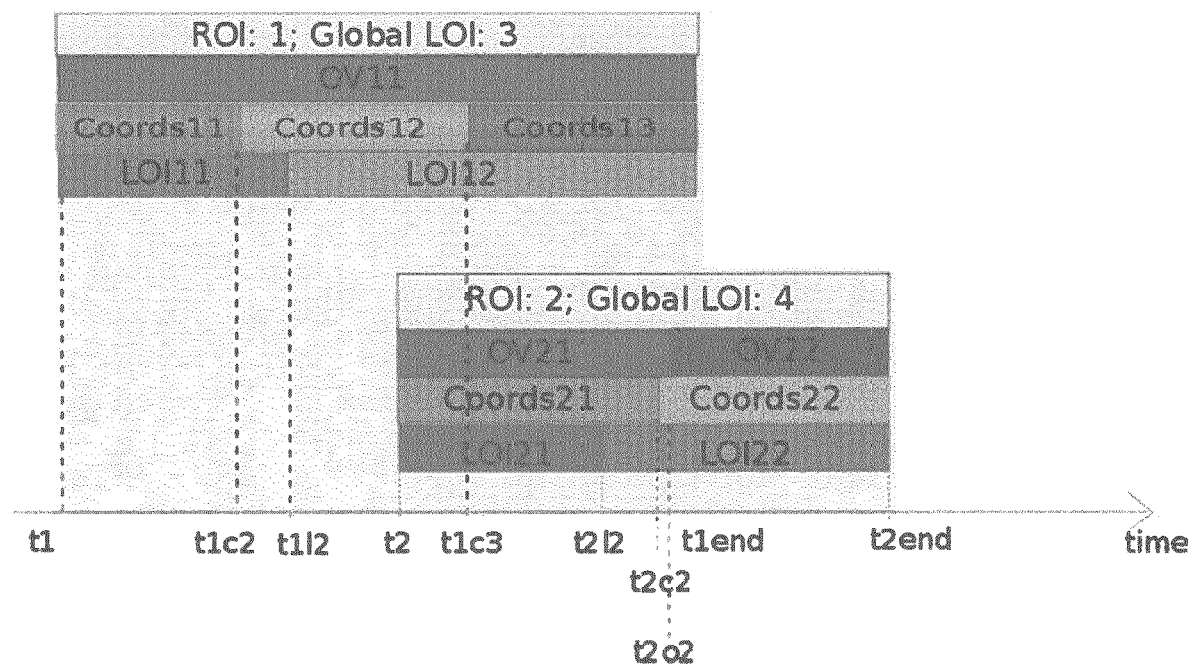
FIG. 5 depicts a timing diagram/timeline of two ROIs identified by an object shape in accordance with an embodiment of the present principles.

FIG. 5 depicts a timing diagram/timeline of two ROIs identified by an object shape in accordance with an embodiment of the present principles. In the example of FIG. 5, the first ROI has a global LOI of 3 associated with it. The first ROI also has associated an OV that is the same all the time and is equal to OV11. In the example of FIG. 5, the first ROI has an associated LOI that evolves over time and takes the values LOI11 and LOI12 at timestamps t1 and t112.

Further, in the embodiment of FIG. 5, the second ROI has a global LOI of 4. The OV of the second ROI of FIG. 2 evolves over time and takes the values OV21 and OV22 and the LOI evolves over time and takes the values LOI21 and LOI22 at timestamps t2 and t212. As recited above, in both cases the ROI is identified by its shape for which the location is provided (i.e., relative to another object).

A difference between the example of FIG. 2 and FIG. 5 is that in FIG. 5, in which the ROIs are identified by a shape, a field to indicate the coordinates of the ROI, which was not needed in the example of FIG. 2, is present. In the example of FIG. 5, the first ROI (1) takes 3 different positions (coords11, coords12 and coords13) and the second ROI (2) takes 2 different positions (coords21 and coords22).

FIG. 6 depicts a representative syntax for providing the information in the timing diagram of FIG. 5 in accordance with an embodiment of the present principles. That is, the syntax of FIG. 6 can be used to provide the information of the example of FIG. 5 to a renderer for use as will be described below.

In accordance with various embodiments of the present principles, the syntax of FIG. 6 can be reduced for efficiency as described above with respect to FIG. 4.

In various embodiments of the present principles, the information of the timing diagram (timeline) is provided to a rendering device such as s video player, 3D engine, processing engine and the like. The renderer analyzes the information in the timing diagram and determines:

when a ROI will become active and for how long
what is its position
what is its OV and how it evolves over time
what is its global LOI and how LOI evolves over time The renderer knows the current pose and orientation of a user in the rendered scene using techniques known in the art. Such techniques will not be described herein. Such information enables a determination of a path a user should follow to reach the OV and a direction in which a user should look to view the ROI.

In various embodiments of the present principles, a user can be alerted to look in a particular direction or more particularly navigation information can be directed to a user using a visual indicator such as at least one or a combination of the following:

a compass.
a bar located at the edge of the screen which moves towards the direction to follow.
in a case having a scene in which the ROIs are identified by object IDs, it is possible to use a miniature of the asset or group of assets representing the ROI.
footprint symbols showing one or more path(s) to follow (to reach optimal viewpoint location for ROI(s)), in which a color pattern linked to the type(s) of objects of interests to which the OV is related.

Figure 7:
FIG. 7 depicts a portion of scene of content including a bar at the edge of a screen to indicate to a user in which direction the user should look/navigate the scene.

For example, FIG. 7 depicts a portion of scene of content including a bar at the edge of a screen to indicate to a user in which direction the user should look/navigate the scene in accordance with an embodiment of the present principles. More specifically, in FIG. 7, the bar at the bottom left edge of the screen indicates to the user to follow the bottom left direction. Although in the embodiment of FIG. 7 the bar is depicted as being positioned in the bottom left of the content directing the user to look in the left direction, in alternate embodiments of the present principles a user's attention can be directed toward any portion of the video content and in any direction of the video content using a visual indicator of the present principles.

In various embodiments of the present principles a user can have the option to select the type of navigation indicator wanted. For example, in one embodiment of the present principles a drop down menu can be populated with several visual indicator options and a user can select a visual indicator to use.

In addition, in accordance with various embodiments of the present principles a notion of distance can be associated with a visual indicator of the present principles. More specifically, in one embodiment the distance to a desired ROI can be expressed by the size of the visual indicator or alternatively can be expressed using a color of the visual indicator red when far from the ROI and green when near or vice versa).

In one embodiment of the present principles a renderer in a preparation step displays navigation information a couple of seconds before a ROI begins to be active. As previously stated, because of the preparation step, a user can anticipate his/her movement towards the ROI/OV such that the user's viewpoint includes the ROI before a sequence of interest is displayed/processed. In such embodiments, such preparation step can further include a color code, a specific symbol, a countdown or another kind of indicator alerting a user that a preparation step has been processed. The parameters of the preparation step, such as duration, can either be hard-coded or set by a user.

In alternate embodiments of the present principles a renderer can display to a user information regarding a global LOI during the preparation step. Information regarding a specific LOI for a portion of the content can be presented to a user using a specific symbol or color code related to the value of the LOI. Such convention can be hard-coded or can be a parameter selectable by a user.

In an embodiment in which several simultaneous OVs exist, an indication for each of the OVs can be presented. Alternatively, an indication of only the most interesting one or ones can be displayed. In an embodiment in which an indication of more than one OV is presented, a user has the ability to decide which indicator to follow to view a desired ROI. The number of simultaneous ROIs can either hard-coded or a parameter the user can set.

In various embodiments of the present principles, data associated with embodiments of the present principles can be stored in a metadata component, similar to subtitles components.

Figure 8:
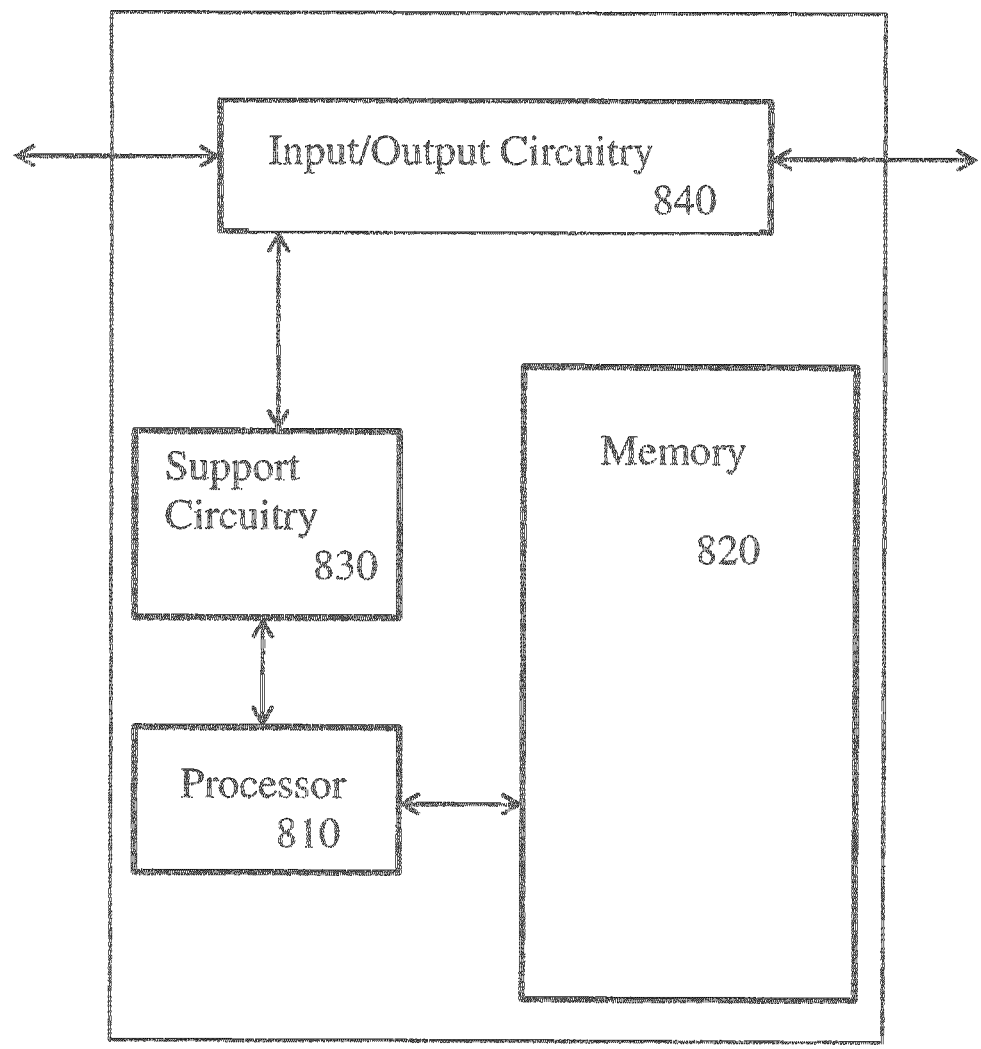
FIG. 8 depicts a high level block diagram of a renderer in accordance with an embodiment of the present principles.

FIG. 8 depicts a high level block diagram of a renderer for implementing the features of the present principles in accordance with an embodiment of the present principles. The renderer of FIG. 8 comprises a processor 810 as well as a memory 820 for storing control programs, instructions, software, video content, data and the like. The processor 810 cooperates with conventional support circuitry 830 such as power supplies, clock circuits, cache memory and the like as well as circuits that assist in executing the software routines stored in the memory 820. As such, it is contemplated that some of the process steps discussed herein as software processes may be implemented within hardware, for example, as circuitry that cooperates with the processor 810 to perform various steps. The renderer of FIG. 8 also includes input-output circuitry 840 that forms an interface between the various respective functional elements communicating with the renderer.

Although the renderer of FIG. 8 is depicted as a general purpose computer that is programmed to perform various control functions in accordance with the present principles, the invention can be implemented in hardware, for example, as an application specified integrated circuit (ASIC). As such, the process steps described herein are intended to be broadly interpreted as being equivalently performed by software, hardware, or a combination thereof.

Figure 9:
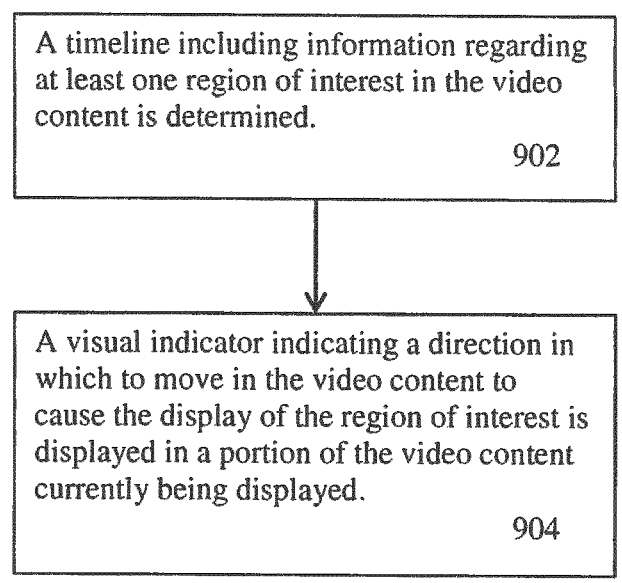
FIG. 9 depicts a flow diagram of a method for facilitating navigation toward a region of interest in an extended scene of video content in accordance with an embodiment of the present principles.

FIG. 9 depicts a flow diagram of a method for facilitating navigation toward a region of interest in an extended scene of video content in accordance with an embodiment of the present principles. The method 900 begins at step 902 during which a timeline including information regarding at least one region of interest in the video content is determined. The method 900 can then proceed to step 904.

At step 904, a visual indicator indicating a direction in which to move in the video content to cause the display of the region of interest is displayed in a portion of the video content currently being displayed. The method 900 can then optionally include any of the other features of the present principles described above. For example, the method 900 can further include the determination of an OV and LOI as described above.

The invention claimed is:

1. A method of rendering at least one indicator when rendering a portion of a video content, the method comprising:
   obtaining data representative of a timeline from a metadata component of the video content, wherein the timeline comprises information representative of a time and a location at which a sequence of interest appears within a virtual scene in the video content, wherein the data is obtained before the time at which the sequence of interest appears in the virtual scene, wherein a user navigates inside the virtual scene in the video content from a current location of a current viewpoint at a current time to a subsequent location of a subsequent viewpoint before the time at which the sequence of interest appears;
   processing the timeline to identify the sequence of interest within the video content before the sequence of interest appears;
   determining the at least one indicator to direct attention toward the subsequent viewpoint from which to view the sequence of interest within the virtual scene, the at least one indicator being determined according to the current viewpoint in the virtual scene and the location of the sequence of interest within the virtual scene, wherein the current viewpoint has the current location and a current viewing direction, and the subsequent viewpoint has the subsequent location and a subsequent viewing direction within the virtual scene and wherein the subsequent location is different from the current location of the current viewpoint; and
   rendering the at least one indicator within a current field of view inside the virtual scene while rendering the portion of the virtual scene, wherein the at least one indicator is rendered prior to the time at which the sequence of interest appears and in time for a user to move within the virtual scene following a trajectory from the current location of the current viewpoint to the subsequent location of the subsequent viewpoint before the time at which the sequence of interest appears in the virtual scene.

2. The method of claim 1, wherein the sequence of interest within the video content is further associated, in the timeline, with at least one rank indicative of a level of interest among a plurality of different levels of interest and wherein the at least one indicator is further determined according to the at least one level of interest.

3. The method of claim 2, wherein the at least one rank indicative of a level of interest is included in the metadata.

4. The method of claim 1, wherein the location of the sequence of interest is determined according to a description of a shape of a two-dimension part of the video content.

5. The method of claim 1, wherein the at least one indicator includes one or more visual objects to be overlaid on the rendered portion of the video content.

6. The method of claim 1, wherein the at least one indicator comprises a haptic effect.

7. The method of claim 1, wherein the video content is a projection of a dynamic three-dimension scene and wherein the location of the sequence of interest is determined according to an object of the three-dimension scene.

8. The method of claim 1, wherein the user navigates continuously inside the virtual scene in the video content from the current location of the current viewpoint at the current time to the subsequent location of the subsequent viewpoint before the time at which the sequence of interest appears.

9. The method of claim 1, wherein the subsequent location is identified by coordinates of an object or shape within the virtual scene in the video content.

10. The method of claim 1, wherein the current location and the subsequent location are identified by coordinates within the virtual scene, and a trajectory function from coordinates of the current location to coordinates of the subsequent location are provided.

11. An apparatus comprising at least one processor and at least one memory having stored instructions operative, when executed by the at least one processor to cause the apparatus to:
    obtain data representative of a timeline from a metadata component of a video content, wherein the timeline comprises information representative of a time and a location at which a sequence of interest appears within a virtual scene in the video content, wherein the data is obtained before the time at which the sequence of interest appears in the virtual scene, wherein a user navigates inside the virtual scene in the video content from a current location of a current viewpoint at a current time to a subsequent location of a subsequent viewpoint before the time at which the sequence of interest appears;
    process the timeline to identify the sequence of interest within the video content before the sequence of interest appears;
    determine at least one indicator to direct attention toward the subsequent viewpoint from which to view the sequence of interest within the virtual scene, the at least one indicator being determined according to the current viewpoint in the virtual scene and the location of the sequence of interest within the virtual scene, wherein the current viewpoint has the current location and a current viewing direction, and the subsequent viewpoint has the subsequent location and a subsequent viewing direction within the virtual scene and wherein the subsequent location is different from the current location of the current viewpoint; and
    render the at least one indicator within a current field of view inside the virtual scene while rendering the portion of the virtual scene, wherein the at least one indicator is rendered prior to the time at which the sequence of interest appears and in time for a user to move within the virtual scene following a trajectory from the current location of the current viewpoint to the subsequent location of the subsequent viewpoint before the event time at which the sequence of interest appears in the virtual scene.

12. The apparatus of claim 11, wherein the sequence of interest within the video content is further associated, in the timeline, with at least one rank indicative of a level of interest among a plurality of different levels of interest and wherein the instructions are further operative to determine the at least one indicator according to the at least one level of interest.

13. The apparatus of claim 12, wherein the at least one rank indicative of a level of interest is included in the metadata.

14. The apparatus of claim 12, wherein the at least one indicator includes at least one of a color code, a specific symbol, a countdown, and a haptic effect.

15. The apparatus of claim 11, wherein the at least one indicator includes one or more visual objects to be overlaid on the rendered portion of the video content.

16. The apparatus of claim 11, wherein the at least one indicator comprises a haptic effect.

17. The apparatus of claim 16, further comprising haptic effectors, wherein the instructions are further operative to render the haptic effects of the indicators on the haptic effectors.

18. The apparatus of claim 11, wherein the video content is a projection of a dynamic three-dimension scene and wherein the location of the sequence of interest is determined according to an object of the three-dimension scene.

19. The apparatus of claim 11, wherein the location of the sequence of interest is determined according to a description of a shape of a two-dimension part of the video content.

20. The apparatus of claim 11, wherein the current location and the subsequent location are one of a user location and a camera location.

\* \* \* \* \*